US007818583B2

(12) United States Patent
Igarashi

(10) Patent No.: US 7,818,583 B2
(45) Date of Patent: Oct. 19, 2010

(54) PERSONAL AUTHENTICATION APPARATUS

(75) Inventor: Yasuhiro Igarashi, Maebashi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1021 days.

(21) Appl. No.: 11/086,916

(22) Filed: Mar. 23, 2005

(65) Prior Publication Data

US 2006/0143470 A1 Jun. 29, 2006

(30) Foreign Application Priority Data

Dec. 24, 2004 (JP) ............................ 2004-374079

(51) Int. Cl.
*G06F 21/00* (2006.01)
*G06F 7/04* (2006.01)
*H04L 9/00* (2006.01)
*H04L 9/32* (2006.01)

(52) U.S. Cl. ............................... 713/186; 726/2; 726/5; 726/17; 726/26; 380/277; 340/5.2; 340/5.21; 340/5.52; 340/5.7; 340/5.8

(58) Field of Classification Search ..................... 726/2, 726/5, 17, 26; 713/186; 380/277; 340/5.2, 340/5.21, 5.3, 5.52, 5.53, 5.7, 5.81, 5.8
See application file for complete search history.

(56) References Cited

U.S. PATENT DOCUMENTS 5,245,329 A * 9/1993 Gokcebay .................. 340/5.33
5,283,431 A * 2/1994 Rhine ......................... 250/229
5,661,457 A * 8/1997 Ghaffari et al. .......... 340/572.7
5,850,753 A * 12/1998 Varma ....................... 70/278.7
5,954,583 A * 9/1999 Green ......................... 463/29
5,999,095 A * 12/1999 Earl et al. .................. 340/542
6,002,497 A 12/1999 Hirama
6,023,224 A * 2/2000 Meyvis .................... 340/545.1
6,064,316 A * 5/2000 Glick et al. ................ 340/5.65
6,314,196 B1 11/2001 Yamaguchi et al.
6,439,009 B1 * 8/2002 Heese et al. ................... 70/92

(Continued)

FOREIGN PATENT DOCUMENTS

CN 1441380 A 9/2003

(Continued)

OTHER PUBLICATIONS

Chinese Office Action dated Jun. 1, 2007 issued in corresponding Application No. 200510063174.3.

(Continued)

*Primary Examiner*—William R Korzuch
*Assistant Examiner*—Trang Doan
(74) *Attorney, Agent, or Firm*—Westerman, Hattori, Daniels & Adrian, LLP

(57) ABSTRACT

The present invention relates to a personal authentication apparatus which registers biometric information unique to each individual person, captures biometric information on the person anew when authenticating the person, and checks the captured biometric information against registered biometric information, whereby the security of registration is improved. A keyhole into which a physical key is inserted and a sensor which detects biometric information such as palm vein patterns are provided. Registration of a user is permitted only if a key is inserted and turned in the keyhole and a person registered as an administrator is authenticated based on biometric information.

15 Claims, 11 Drawing Sheets

U.S. PATENT DOCUMENTS

| | | | | |
|---|---|---|---|---|
| 6,624,739 | B1 * | 9/2003 | Stobbe | 340/5.2 |
| 6,898,299 | B1 * | 5/2005 | Brooks | 382/115 |
| 6,965,294 | B1 * | 11/2005 | Elliott et al. | 340/5.2 |
| 7,054,470 | B2 * | 5/2006 | Bolle et al. | 382/124 |
| 7,113,074 | B2 * | 9/2006 | Gutta et al. | 340/5.53 |
| 7,170,998 | B2 * | 1/2007 | McLintock et al. | 380/277 |
| 7,218,202 | B2 * | 5/2007 | Bacchiaz et al. | 340/5.52 |
| 2001/0026632 | A1 | 10/2001 | Tamai | |
| 2001/0036301 | A1 | 11/2001 | Yamaguchi et al. | |
| 2002/0002688 | A1 * | 1/2002 | Gregg et al. | 713/202 |
| 2002/0059523 | A1 * | 5/2002 | Bacchiaz et al. | 713/200 |
| 2002/0125990 | A1 * | 9/2002 | Emmei | 340/5.6 |
| 2003/0200778 | A1 * | 10/2003 | Chhatwal | 70/408 |
| 2004/0071322 | A1 * | 4/2004 | Choshi et al. | 382/115 |
| 2004/0183652 | A1 * | 9/2004 | Deng et al. | 340/5.53 |
| 2004/0263315 | A1 * | 12/2004 | Kim et al. | 340/5.7 |
| 2005/0077995 | A1 * | 4/2005 | Paulsen et al. | 340/5.6 |
| 2005/0249382 | A1 * | 11/2005 | Schwab et al. | 382/115 |
| 2007/0132546 | A1 * | 6/2007 | Nakamura et al. | 340/5.3 |

FOREIGN PATENT DOCUMENTS

| | | | |
|---|---|---|---|
| JP | 9-102038 | A | 4/1997 |
| JP | 2001-134338 | | 5/2001 |
| JP | 2001-273498 | A | 10/2001 |
| JP | 2003-85539 | | 3/2003 |
| JP | 2004-112172 | | 4/2004 |

OTHER PUBLICATIONS

Japanese Notice of Reasons for Rejection, dated May 25, 2010, issued in corresponding Japanese Patent Application No. 2004-374079.

* cited by examiner

PERSONAL AUTHENTICATION APPARATUS

BACKGROUND OF THE INVENTION

1. Field of the Invention

The present invention relates to a personal authentication apparatus that registers biometric information unique to each individual person, and captures the person's biometric information anew when performing authentication, and checks it against the registered biometric information to authenticate the person.

2. Description of the Related Art

Facilities and equipment that require personal authentication for the opening and closing entrance doors of rooms or buildings or operating information processing devices in order to improve security or protect privacy have proliferated in recent years. For such authentication, code numbers have been widely used traditionally. In recent years, more secure personal authentication methods are becoming widespread in which sensors are provided to detect some biometric information unique to every individual, such as fingerprints or palm or pupil vein patterns, for performing personal authentication (see Japanese Patent Laid-Open No. 2003-85539 and No. 2004-112172).

A problem with a code number is that, if it is known to other person, the person can readily impersonate the holder of the code number. In contrast, personal authentication that relies on biometric information, which varies from person to person, can significantly reduce threat of impersonation.

However, because authentication relying on biometric information uses a technique in which a person's biometric information is registered beforehand and biometric information is checked against the registered biometric information during authentication, a malicious, illegitimate person may be authenticated as a legitimate person if the malicious person registers his or her biometric information. The problem is how to allow only legitimate individuals to be registered and how to reject registration of malicious, illegitimate individuals.

SUMMARY OF THE INVENTION

The present invention has been made in view of the above circumstances and provides a personal authentication apparatus capable of performing registration with improved security.

According to the present invention, there is provided a personal authentication apparatus having a biometric information capturing section which captures personal biometric information, a biometric information storage which stores personal biometric information captured by the biometric information capturing section in the past, and an authenticating section which checks biometric information currently captured by the biometric information capturing section against biometric information stored in the biometric information storage to authenticate a person associated with the currently captured biometric information, the personal authentication apparatus including: a biometric information registering section which causes the biometric information capturing section to capture biometric information on a new person for registering the biometric information and registers the biometric information captured by the biometric information capturing section in the biometric information storage; and a key setting section in which a predetermined key is to be set; wherein, if the predetermined key is set in the key setting section and the authenticating section authenticates an administrator who is a specific person among the persons whose biometric information is stored in the biometric information storage, the biometric information on the new person is registered.

The present invention permits registration of a new person's biometric information only if a key is set in a key setting section and an administrator is authenticated, whereby high-level security during registration of the biometric information is ensured.

In the personal authentication apparatus of the present invention, the biometric information capturing section is preferably a biometric information sensor that detects biometric information. Typically, the biometric information sensor may be a sensor that detects a palm vein pattern.

Also, preferably the key setting section in the personal authentication apparatus of the present invention has a keyhole into which a physical key is inserted, and the key is set only if predetermined operations, including the operation of inserting the predetermined physical key into the keyhole, are performed.

Furthermore, preferably the biometric information storage in the personal authentication apparatus is capable of storing biometric information of more than one administrator and the key setting section allows only one model of key to be set regardless of the number of the administrators.

For example, in a control system for the entrance of a relatively large building or a condominium, more than one caretaker or doorkeeper may take care of the building or condominium in shifts. In such a case, it is desirable that the personal authentication apparatus allow more than one person to be registered as administrator. Even in that case, the key setting section allows only one model of key to be set, whereby the security of registration can be highly ensured.

As has been described, according to the present invention, high-level security during registration of biometric information is ensured.

DETAILED DESCRIPTION OF THE INVENTION

An embodiment of the present invention will be described below.

Figure 1:
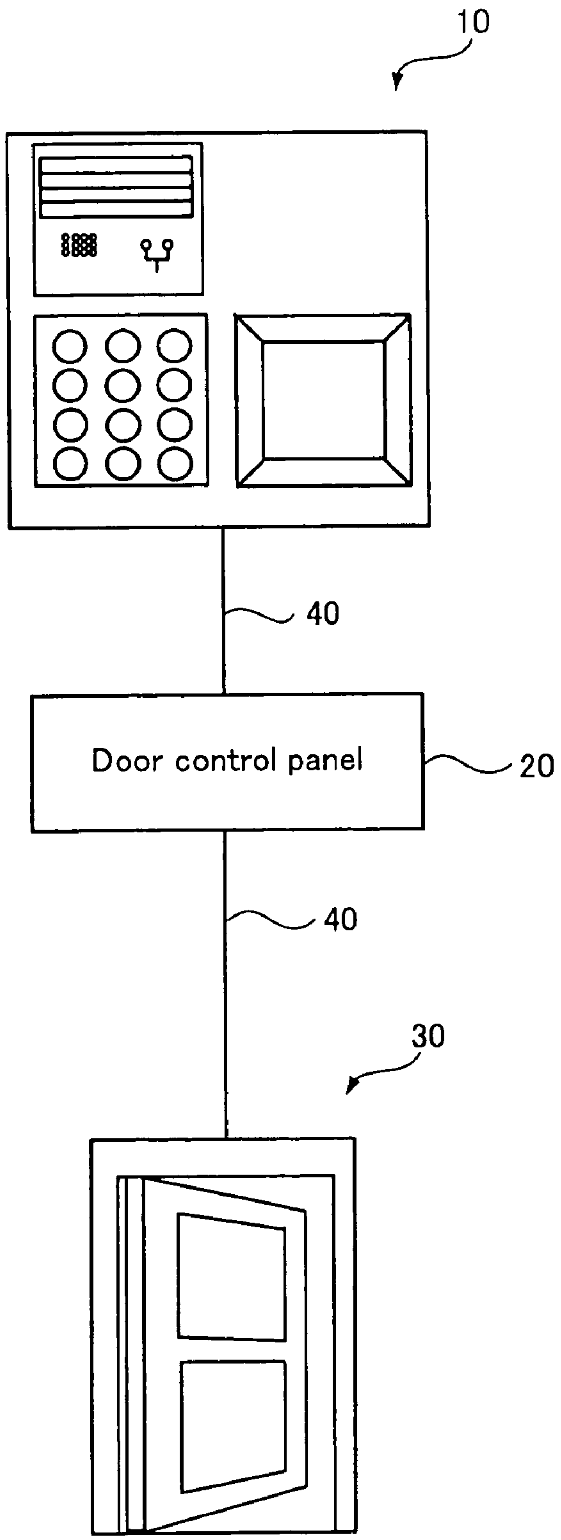
FIG. 1 shows an overview of a door control system in which a personal authentication apparatus is incorporated according to an embodiment of the present invention.

FIG. 1 shows an overview of a door control system in which a personal authentication apparatus is incorporated according to one embodiment of the present invention.

Shown in FIG. 1 are, a gate controller 10, a door control panel 20, and a door 30, which are interconnected through a line 40.

The door 30 is provided at the entrance of a building or a room, for example, and includes an electric lock (not shown), which is locked and unlocked through control from the door control panel 20.

The door control panel 20 drives the electric lock of the door 30 over the line 40 under the control of the gate controller 10.

The gate controller 10 is provided near the door 30, performs personal authentication to determine whether a person is authorized to pass the entrance at which the door 30 is provided and, if it determines that the person is authenticated to pass the entrance, provides a control signal to the door control panel 20 over the line 40 to cause it unlock the electric lock of the door 30.

Figure 2:
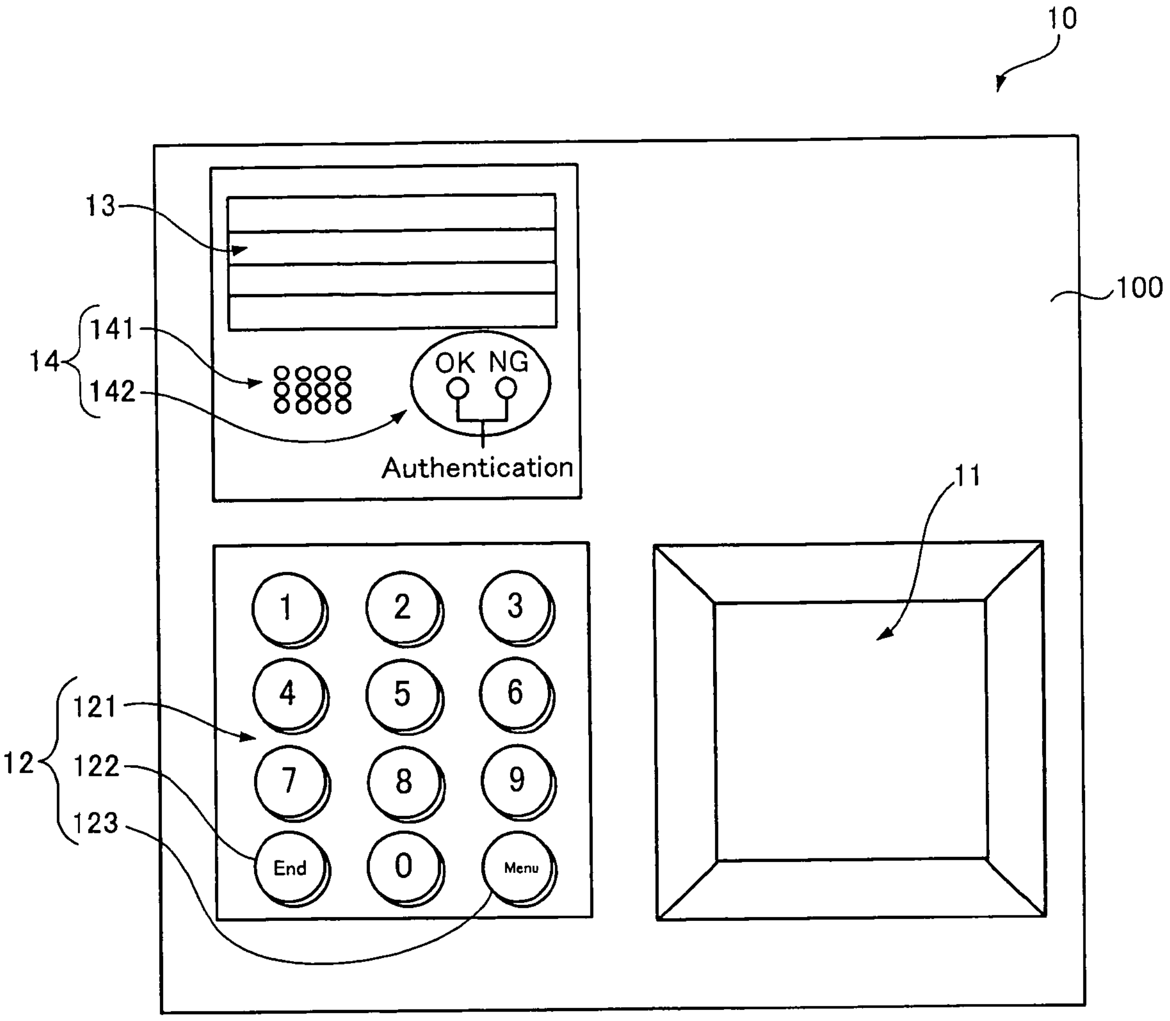
FIG. 2 shows an operation panel of a gate controller.

FIG. 2 shows an operation panel on the gate controller 10.

Provided on the operation panel 100 of the gate controller are a biometric information sensor 11, a keyboard 12, an input/output display 13, and alarm mechanism 14.

The biometric information sensor 11 detects palm vein patterns. When a palm is placed over the biometric information sensor 11, the sensor 11 detects the vein pattern on the palm placed over the biometric information sensor 11 by using infrared rays.

The keyboard 12 includes a ten-key pad 121 labeled with numbers 0 to 9, an end key 122, and a menu key 123, which are push buttons to be depressed for inputting a user ID or using a control function of the gate controller 10.

The input/output display 13 displays the ID input by the user, the result of execution of a control function of the gate controller 10, operation guidance, an alarm message or the like.

The alarm mechanism 14 includes an audio output section 141 having a speaker inside it and a light emitting section 142 in which LEDs are provided and indicates the result of authentication by producing sound and turning on a lamp.

Figure 3:
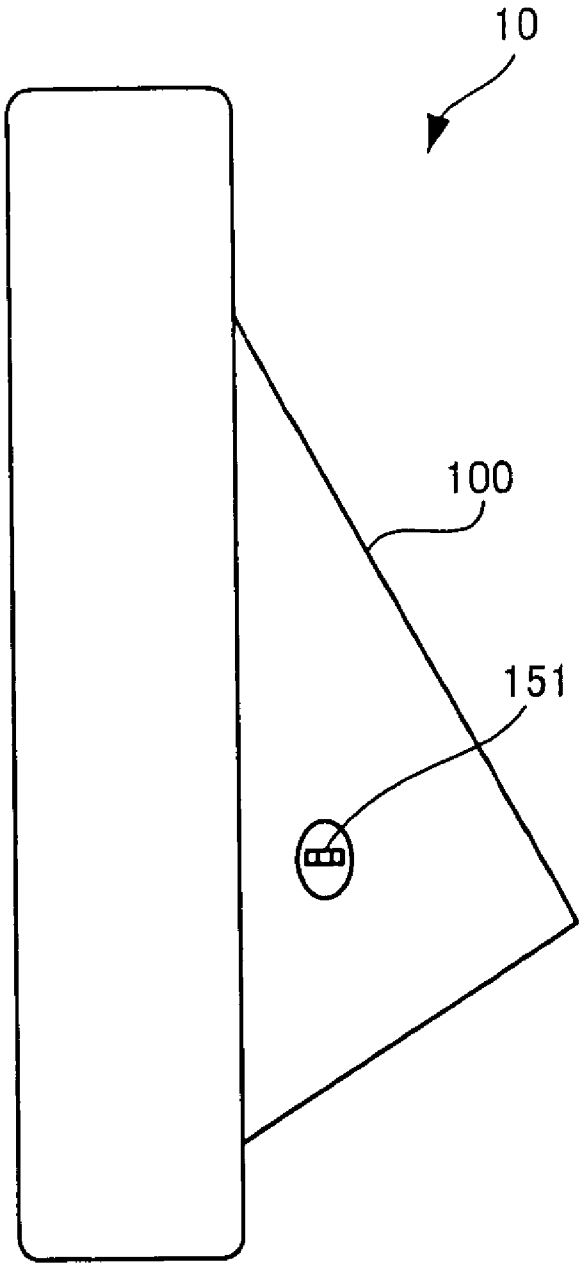
FIG. 3 shows a side view of the gate controller.

FIG. 3 is a side view of the gate controller 10.

The gate controller 10 has a structure intended to be mounted on a wall in a building or room near the door 30 as shown in FIG. 1. The operation panel 100 is slanted upward. Provided on a side wall of the gate controller 10 is a keyhole 151 into which a physical key is fit. When a specific key is inserted into the keyhole 151, the inserted key can be turned to a predetermined angle. When the key is inserted and turned, the gate controller 10 recognizes that it is operated by a right key. In the present embodiment, inserting and turning a right key in the keyhole 151 is referred to as setting a key.

Figure 4:
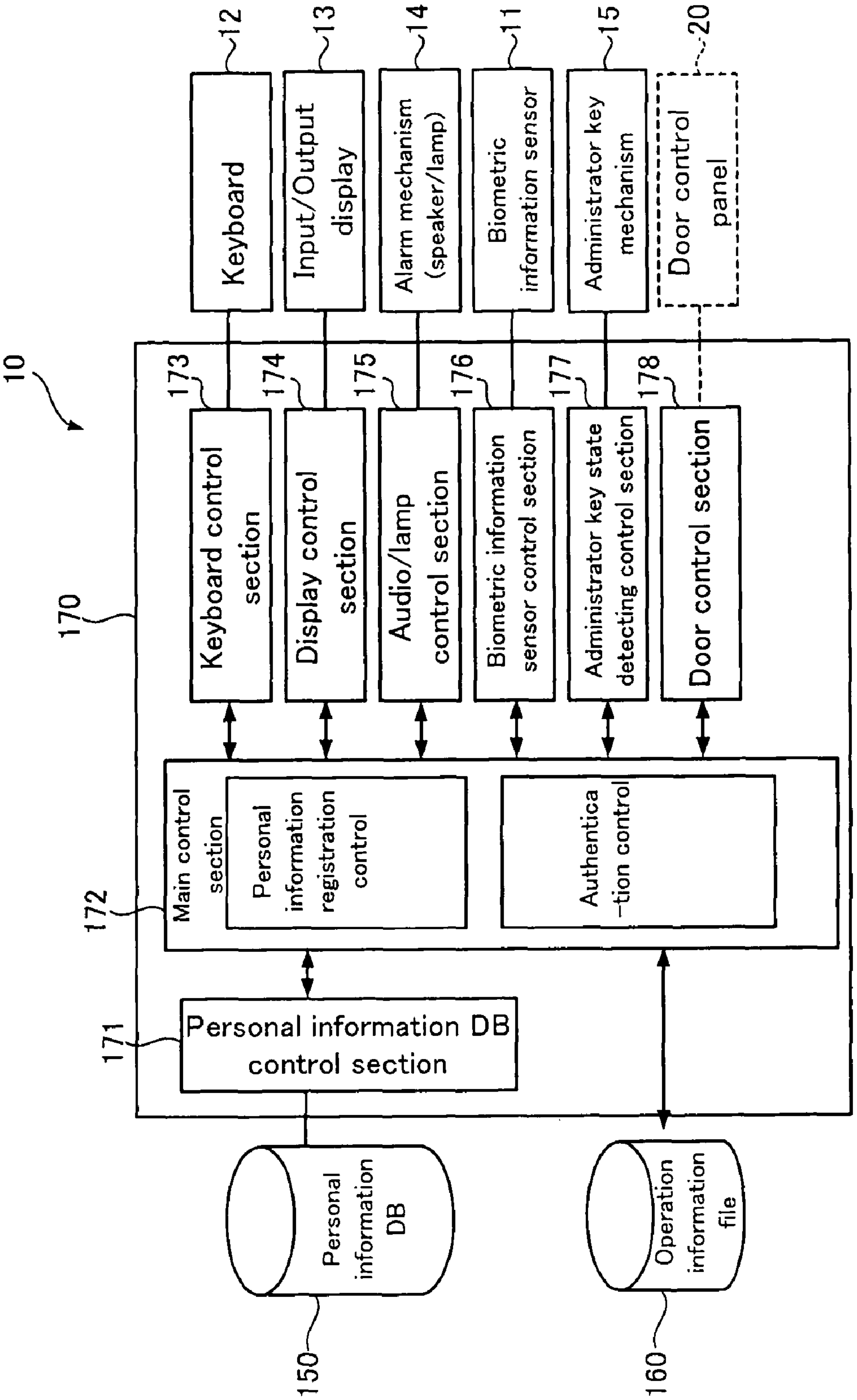
FIG. 4 is a block diagram showing a configuration of the gate controller.

FIG. 4 is a block diagram showing a configuration of the gate controller 10.

Shown in FIG. 4 are personal information database (DB) 150, an operation information file 160, and a control section 170, as well as the keyboard 12, input/output screen 13, alarm mechanism 14, and biometric information sensor 11, which are also shown in FIG. 2. An administrator key mechanism 15 including the keyhole 151 shown in FIG. 3 is also provided.

Figure 5:
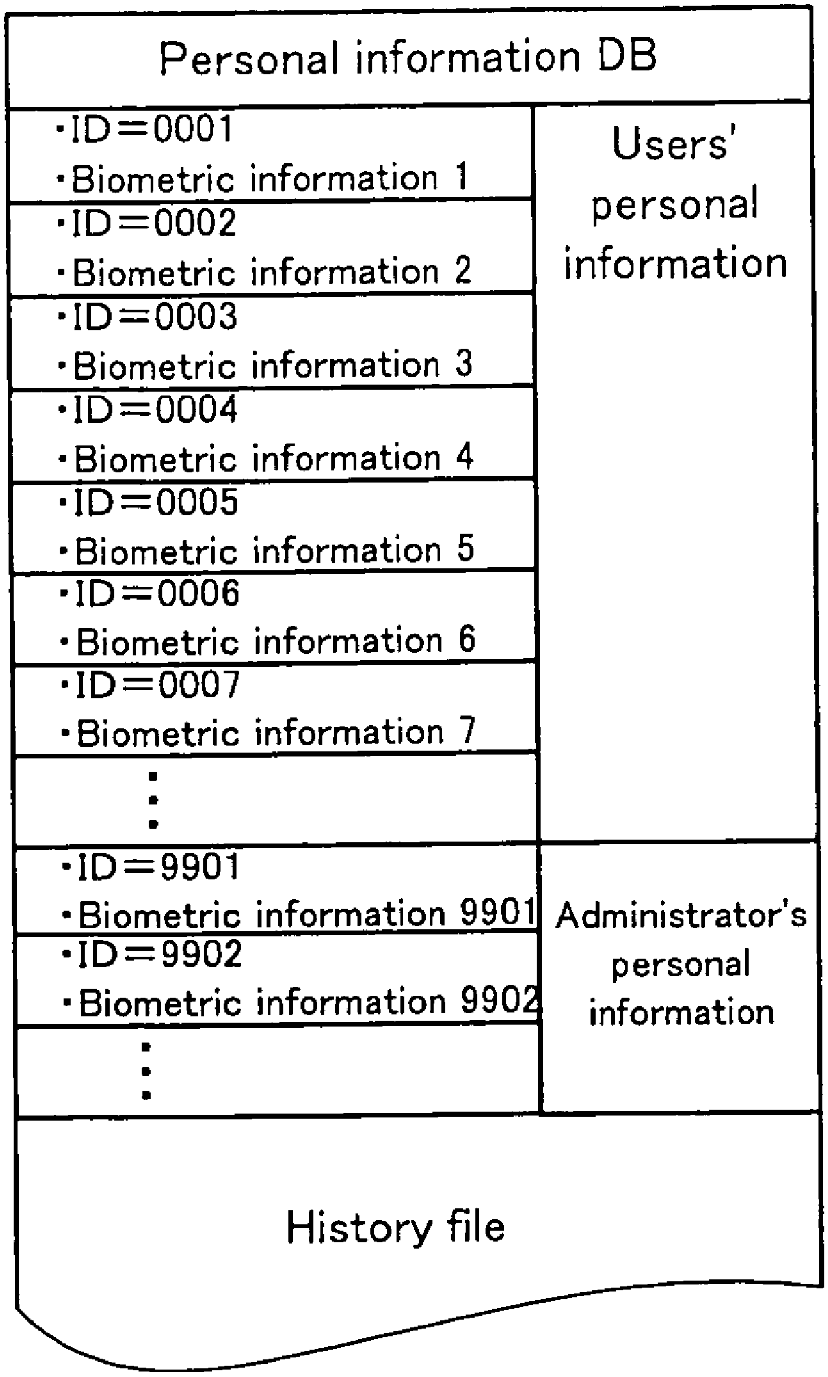
FIG. 5 shows information in a personal information DB.

FIG. 5 shows information in the personal information DB 150.

The personal information DB 150 stores personal information and history. Registered as the personal information are both of personal information on users who are authorized to pass the door 30 shown in FIG. 1 and personal information on administrators who take care of the building including the door 30.

Each item of personal information on each person comprises a combination of an ID and biometric information (palm vein pattern, in this example) which identify the person. Each of the user IDs and administrator IDs is a four-digit number. The first two digits of a user ID are any numbers except "99" and the first two digits of an administrator ID are "99", which allows the person to be identified as administrator.

History of registration and deletion of users are written in a history file. As will be described later, the registration of a user requires the presence of an administrator. In the event of an accident, the administrator who witnessed the registration of the user can be identified from records in the history.

Referring back to FIG. 4, the description is continued.

The operation information file 160 shown in FIG. 4 contains various kinds of information for operating the door control system, such as display patterns to be displayed on the input/output display 13 and audio patterns to be presented to users through the alarm mechanism 14.

The control section 170 includes a personal information DB control section 171, a main control section 172, a keyboard control section 173, a display control section 174, an audio/lamp control section 175, a biometric information sensor control section 176, an administrator key state detection control section 177, and a door control section 178.

The personal information DB control section 171 is responsible for accessing the personal information DB 150 according to instructions from the main control section 172.

The main control section 172 is responsible for controlling the registration of personal information and controlling authentication. Control by the main control section 172 will be described later.

The keyboard control section 173 is responsible for detecting operations on the keyboard 12 and communicating them to the main control section 172. The display control section 174 displays information such as IDs on the input/output display 13 in response to instructions from the main control section 172.

The audio/lamp control section 175 controls the speaker and lamps provided in the alarm mechanism 14 in response to an instruction from the main control section 172. The biometric information sensor control section 176 controls the biometric information sensor 11 to detect a palm vein pattern and sends the detected palm vein pattern to the main control section 172. The administrator key state detection control section 177 is responsible for determining whether a key is inserted and turned (is set) in the keyhole 151 (see FIG. 3) of the administrator key mechanism 15 and sending the result of the determination to the main control section 172. The door control section 178 outputs a control signal for locking or unlocking the electric lock of the door 30 (see FIG. 1) to the door control panel 20 in response to an instruction from the main control section 172.

Personal information registration control and authentication control performed in the main control section 172 will now be described below.

Figure 6:
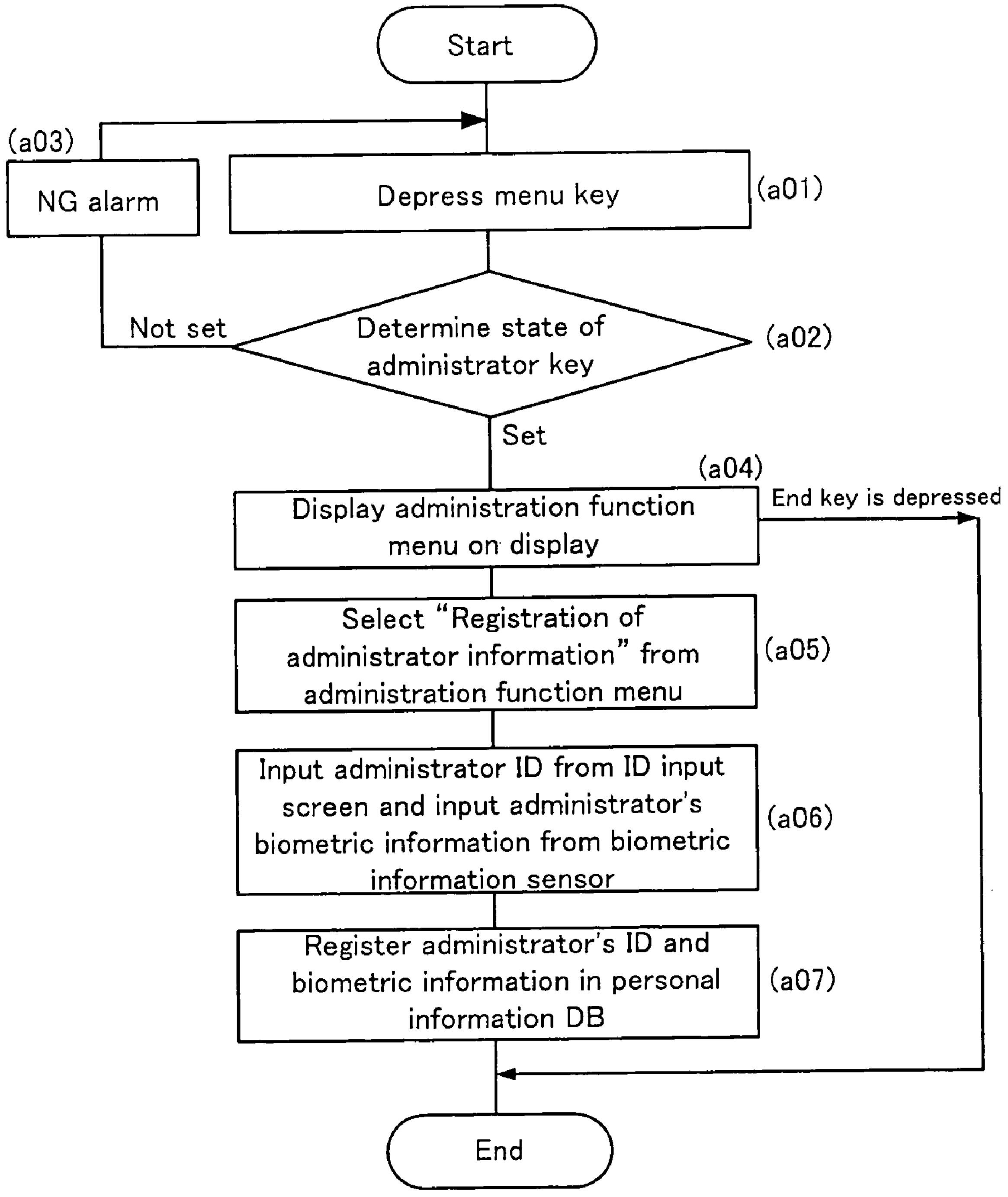
FIG. 6 shows a control flow during registration of an administrator.

FIG. 6 shows a control flow during registration of an administrator.

First, the menu key 123 on the keyboard 12 shown in FIG. 2 is depressed (step a01) and the state of an administrator key is determined in response to the depression of the menu key 123 (step a02). The determination as to the state of an administrator key herein is determination whether a predetermined key is inserted and turned (is set) in the keyhole 151 shown in FIG. 3. If the key is not set, an NG alarm is generated (step a03).

If the menu key 123 is depressed and it is determined that the administrator key is set, an administration function menu is displayed (step a04).

Figure 7:
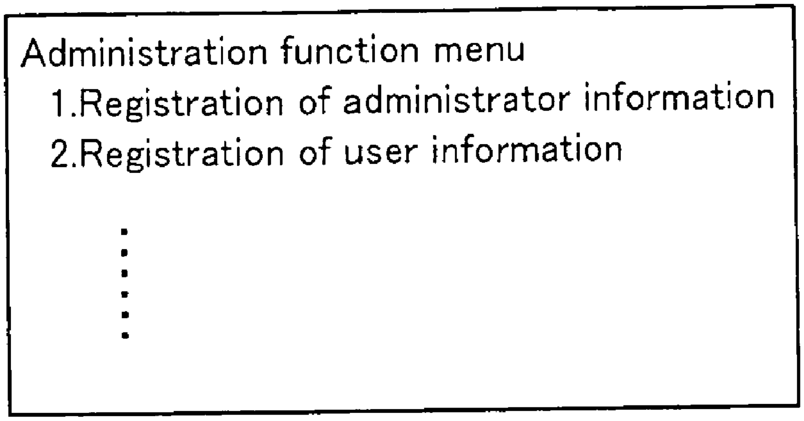
FIG. 7 shows an administration function menu.

FIG. 7 shows the administration function menu screen.

Displayed on the menu are "1. Registration of administrator information", "2. Registration of user information", and other options. When the "1" key on the keyboard 12 (see FIG. 2) is depressed while the administration function menu is displayed, execution of the "Registration of administrator information" is selected (step a05).

It should be noted that if the end key 122 shown in FIG. 2 is depressed while the administration function menu is displayed, the administration function will end without any operation being performed.

Next, an ID and biometric information for registering the administrator is inputted (step a06 in FIG. 6).

Figure 8:
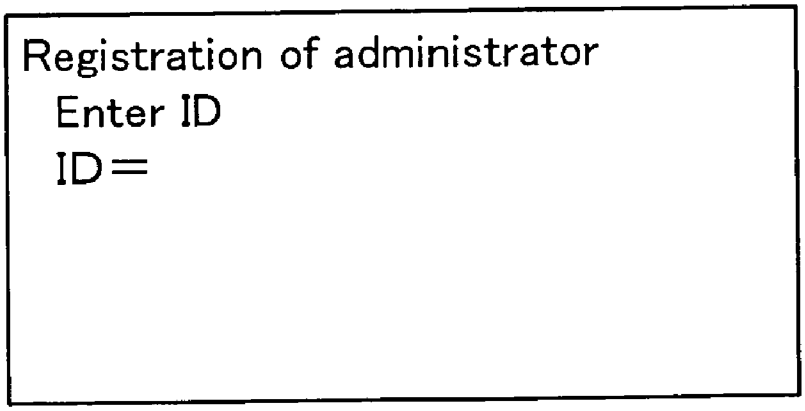
FIG. 8 shows an ID input screen displayed during registration of administrator.

FIG. 8 shows an ID input screen for registering an administrator.

When the "Registration of administrator information" is selected, the screen shown in FIG. 8 is displayed prompting the operator to input an administrator ID to be registered. When an ID is inputted through the ten-key pad 121 on the keyboard 12 shown in FIG. 2, the inputted ID is displayed on the ID input screen shown in FIG. 8. Only administrator IDs that have "99" as their first two digits and are not identical to the ID of an administrator already registered are accepted. After inputting the ID, the operator places one of his or her palm over the biometric information sensor 11 to cause it to detect the palm vein pattern.

Then, the ID and biometric information thus inputted are registered in the personal information DB 150 (see FIGS. 4 and 5) (step a07 in FIG. 6).

Figure 9:
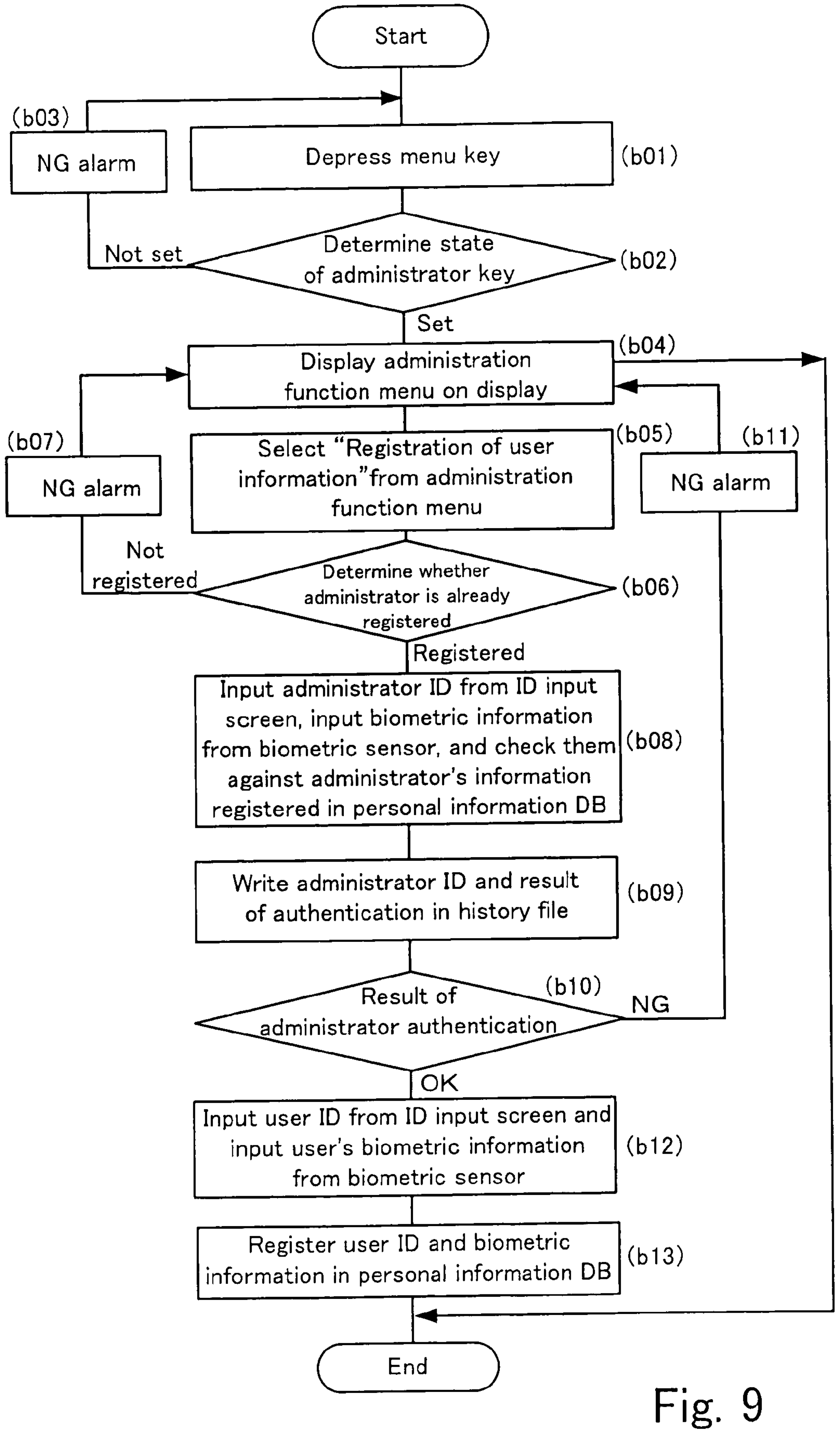
FIG. 9 shows a control flow during user registration.

FIG. 9 shows a control flow during user registration.

As in the administrator registration (see FIG. 6), first the menu key 123 on the keyboard shown in FIG. 2 is depressed (step b01), and whether an administrator key is set or not is determined in response to the depression of the menu key 123 (step b02). If not set, an alarm is generated (step b03).

If it is determined that an administrator key is set, the administration function menu shown in FIG. 7 is displayed (step b04). If the end key 122 is depressed at this stage, the execution of the administration function will end without anything being performed.

When the "Registration of user information" is selected by depressing the "2" key on the ten-key pad 121 of the keyboard 12 while the administration function menu shown in FIG. 7 is displayed on the input/output display 13 (step b05), determination is made as to whether an administrator has been registered or not (step b06), if no administrator is registered, an NG alarm is generated (step b07) to indicate that registration of an administrator should be performed first.

If an administrator has been registered, the ID and biometric information are inputted, and authentication of the administrator is performed by checking the information against information on the administrator registered in the personal information DB (step b08), and the ID of the administrator and the result of the authentication is written in the history file (see FIG. 5) (step b09).

If the result of the administrator authentication is unsuccessful (step b10), an NG alarm is generated (step b11). If the authentication is successful, a user ID and the user's biometric information is inputted (step b12) and the inputted user ID and biometric information are registered in the personal information DB 150 (step b13).

As shown in FIG. 9, the user registration requires both of key setting and authentication of an administrator. Thus, registration of a malicious illegitimate person can be reliably prevented.

Figure 10:
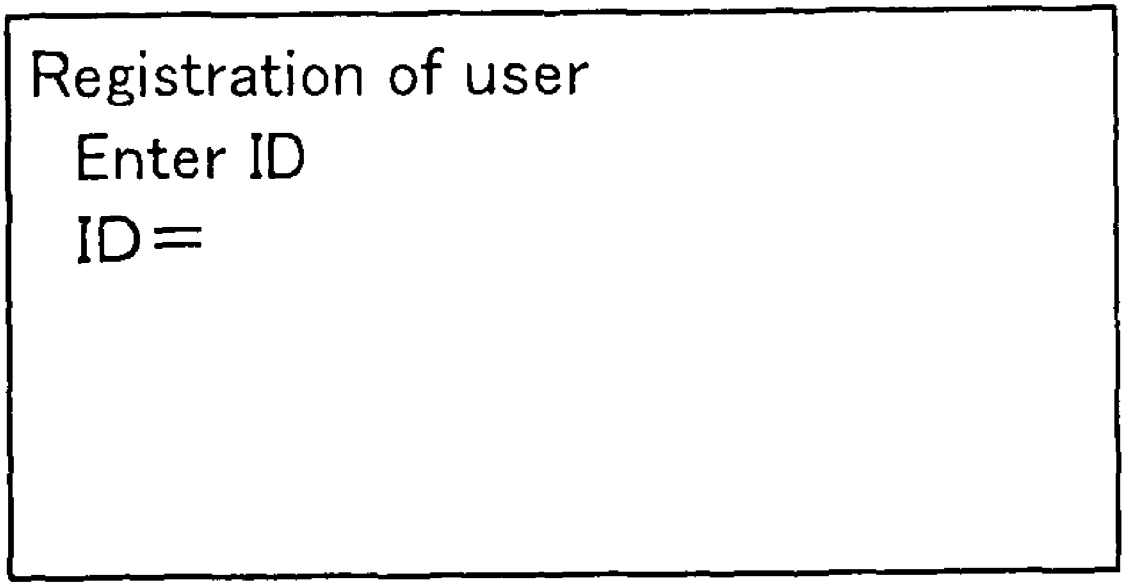
FIG. 10 shows an ID input screen displayed during registration of a user.

FIG. 10 shows the ID input screen displayed during user registration (step b12 in FIG. 9).

When the ID input screen shown in FIG. 10 is displayed on the input/output display 13 shown in FIG. 2, a user ID can be inputted. When an ID is inputted through the ten-key pad 121, the inputted ID is displayed on the screen for confirmation by the user. Only IDs that are not identical to the ID of a user already registered and have numbers except "99" as their first two digits are accepted.

Figure 11:
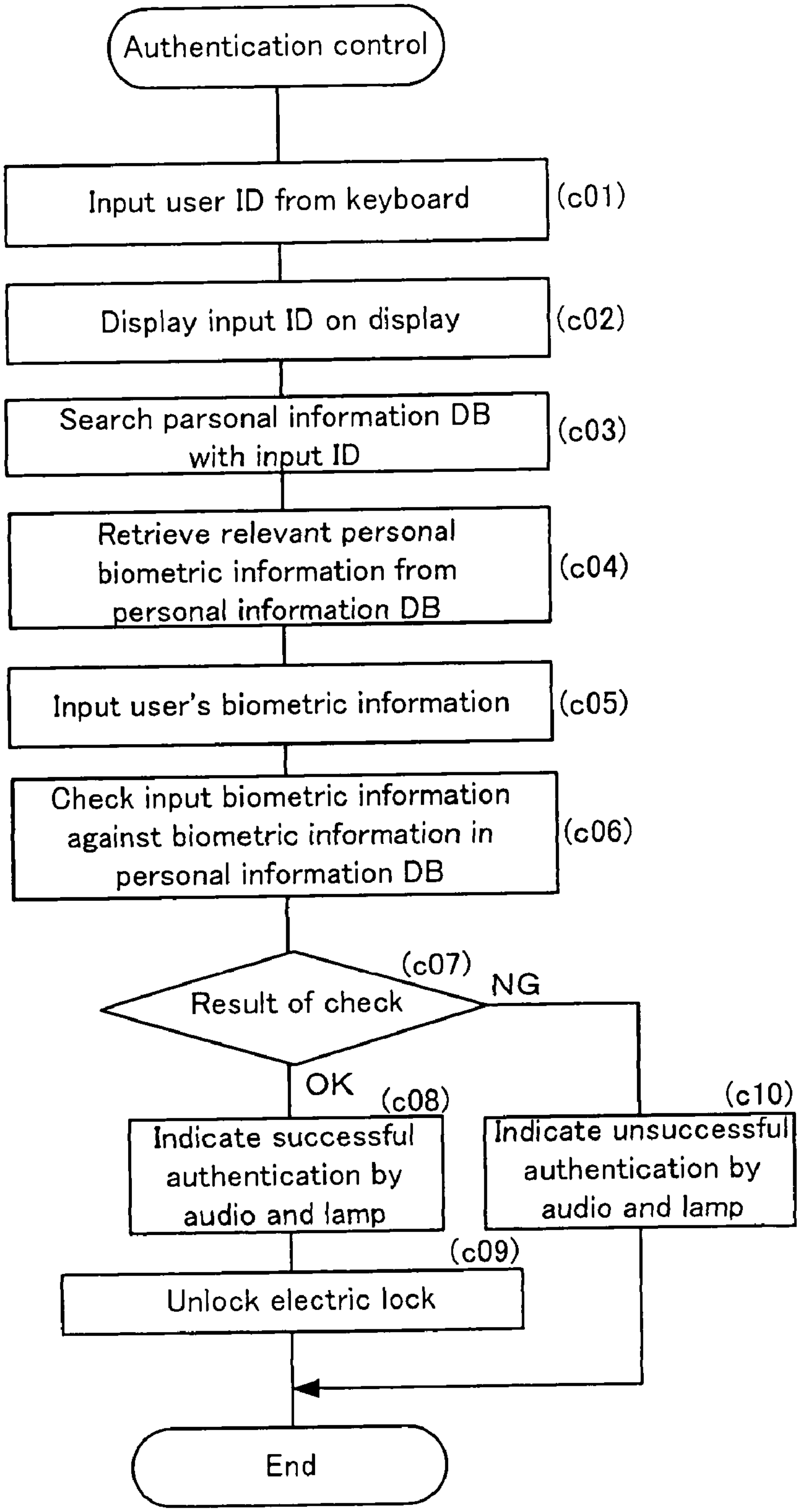
FIG. 11 shows a control flow during authenticating a user.

FIG. 11 shows a control flow for authenticating a user.

The ID of an user is inputted through the keyboard (step c01) and the inputted ID is displayed on the input/output display 13 (step c02).

Figure 12:
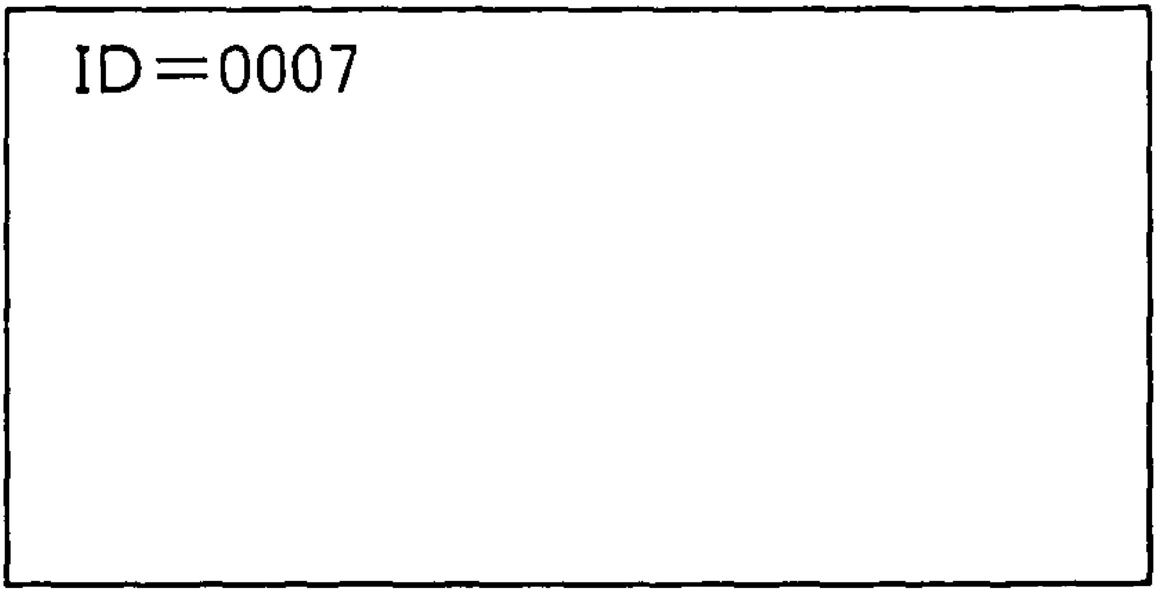
FIG. 12 shows an input/output display on which an inputted ID is displayed.

FIG. 12 shows the input/output screen on which the input ID is displayed.

In this example, "0007" is inputted.

Referring back to FIG. 11, the description of the control flow is continued.

After the user ID is inputted as described above, the personal information DB 150 is searched using the inputted ID (step c03) and biometric information of the user that matches the ID is retrieved (step c04).

When the user places one of his or her palms over the biometric information sensor 11, biometric information from the palm is inputted (step c05) and the inputted biometric information is checked against the biometric information retrieved from the personal information DB (step c06).

If it is determined as the result of the check that the person is registered as a user (step c07), the successful authentication is indicated by audio and lamp indication (step c08) and the electric lock is unlocked (step c09). On the other hand, if it is determined as the result of the check that the person is not registered as a user (step c07), the unsuccessful authentication is indicated by audio and lamp indication (step c10).

While, beside the processes described above, other processes such as deletion of a user or an administrator and change of an ID are performed in the gate controller 10, they are not subjects herein and therefore the description of which is omitted.

While palm vein patterns are used as biometric information in the example described above, the biometric information is not limited to palm vein patterns. Other biometric information such as pupil vein patterns, fingerprints, or faces by which individuals can be recognized may be used.

While personal authentication is performed and the result is used for controlling the opening and closing of a door in the example described above, the usage of the result of personal authentication is no object in the present invention. The present invention can be used in any applications.

What is claimed is:

1. An apparatus, comprising:

a biometric information capturing section which captures personal biometric information, a biometric information storage section which stores registered personal biometric information, an authenticating section which compares the personal biometric information captured by the biometric information capturing section with the registered biometric information stored in the biometric information storage section, and authenticates a previously registered administrator user or a previously registered non-administrator user if the personal biometric information of the previously registered administrator user or the previously registered non-administrator user captured by the biometric information capturing section matches the registered biometric information stored in the biometric information storage section, a key setting section in which a predetermined key is to be set, wherein the key setting section has a keyhole into which a physical key is inserted, and wherein the key is set in the key setting section if predetermined operations are performed, the predetermined operations including the operation of inserting a predetermined physical key in the keyhole, and a biometric information registering section which registers biometric information of a new administrator user or a new non-administrator user by storing the biometric information captured by the biometric information capturing section in the biometric information storage section only when the predetermined key is set in the key setting section and at the same time the previously registered administrator is authenticated by the authenticating section.

2. The apparatus according to claim 1, wherein the biometric information capturing section is a biometric information sensor which detects biometric information.

3. The apparatus according to claim 2, wherein the biometric information sensor is a sensor which detects a palm vein pattern.

4. The apparatus according to claim 1, wherein the biometric information storage section is capable of storing biometric information on a plurality of administrator users, and wherein the key setting section allows only one model of key to be set regardless of the number of administrator users.

5. The apparatus according to claim 1, wherein authentication of the previously registered administrator user or the previously registered non-administrator user includes outputting a control signal to unlock an electric lock.

6. The apparatus according to claim 2, wherein authentication of the previously registered administrator user or the previously registered non-administrator user includes outputting a control signal to unlock an electric lock.

7. The apparatus according to claim 3, wherein authentication of the previously registered administrator user or the previously registered non-administrator user includes outputting a control signal to unlock an electric lock.

8. The apparatus according to claim 4, wherein authentication of the previously registered administrator user or the previously registered non-administrator user includes outputting a control signal to unlock an electric lock.

9. The apparatus according to claim 5, wherein authentication of the previously registered administrator user or the previously registered non-administrator user includes outputting a control signal to unlock an electric lock.

10. A method, comprising:

detecting the presence of an administrator key in a keyhole, wherein the administrator key is a physical key, detecting personal biometric information of a previously registered administrator user using a biometric information capturing section, authenticating the previously registered administrator user when:

(i) the personal biometric information captured by the biometric information capturing section matches registered biometric information for the previously registered administrator user stored in a biometric information storage section, and (ii) the administrator key is detected in the keyhole, detecting personal biometric information of a new user using the biometric information capturing section, and registering the personal biometric information of the new user in the biometric information storage section only if the previously registered administrator user was authenticated in the authenticating step.

11. The method according to claim 10, wherein the biometric information capturing section is a biometric information sensor which detects biometric information.

12. The method according to claim 11, wherein the biometric information sensor is a sensor which detects a palm vein pattern.

13. The method according to claim 10, wherein the biometric information storage section stores biometric information on a plurality of administrator users, and wherein only one model of key is fitted into the keyhole regardless of the number of administrator users.

14. The method according to claim 11, wherein the biometric information storage section stores biometric information on a plurality of administrator users, and wherein only one model of key is fitted into the keyhole regardless of the number of administrator users.

15. The method according to claim 12, wherein the biometric information storage section stores biometric information on a plurality of administrator users, and wherein only one model of key is fitted into the keyhole regardless of the number of administrator users.

* * * * *